United States Patent Office 3,391,190
Patented July 2, 1968

3,391,190
CONTINUOUS EXTRACTIVE OXIDATION
John R. Kilsheimer, Westfield, Peter R. Taussig, Mountainside, and Leon Starr, Plainfield, N.J., assignors to Mobil Oil Corporation, a corporation of New York
No Drawing. Filed Apr. 15, 1966, Ser. No. 542,760
4 Claims. (Cl. 260—586)

ABSTRACT OF THE DISCLOSURE

Alkanes and cycloalkanes ($C_5$–$C_{16}$) are continuously oxidized in a reaction vessel at 125–180° C. and at 80–600 p.s.i.g. to the corresponding alcohols and ketones. The improvement lies in continuously extracting the alcohols and ketones from the reaction mixture in the reaction vessel, while the reaction is proceeding, with solvents, such as ethylene glycol, propylene glycol, and propylene glycol containing 1–16 volume percent water or ethylene glycol.

---

This invention relates to the oxidation of lower alkanes and cycloalkanes. It is more particularly concerned with a continuous process for oxidizing lower alkanes and cycloalkanes, particularly cyclohexane, to ketones and alcohols.

As is well known to those familiar with the art, in the oxidation of alkanes, such as cyclohexane, the reaction is terminated at low conversion levels (1–15%), and the desired ketone and alcohol products must be distilled from large amounts of unreacted alkane. If the oxidation reaction is continued to higher conversion levels, the desired products are further oxidized and degraded to undesirable by-products that constitute a loss to the overall process.

Instead of separating unreacted hydrocarbon by distillation, it has been proposed to extract the oxygenated compounds with ethylene glycol. Such extraction, however, is taught to be carried out at temperatures and pressures below oxidation temperatures, e.g., well below 100° C. Accordingly, the oxidation reaction must be terminated and the temperature lowered to the extraction step.

It has now been discovered that the oxidation of lower alkanes and cycloalkanes can be carried out continuously by continuously extracting, from the oxidation mixture, the desired alcohol and ketone products with solvents that are immiscible with the hydrocarbon reactant and essentially unreactive under the oxidation reaction conditions.

Accordingly, it is a broad object of this invention to provide an improved process for oxidizing lower alkanes and cycloalkanes. A further object is to provide a continuous process for oxidizing lower alkanes and cycloalkanes. A specific object is to provide a continuous process for oxidizing lower alkanes and cycloalkanes, wherein desired oxidation products are continuously extracted from the oxidation mixture. Other objects and advantages of this invention will become apparent to those skilled in the art, from the following detailed description.

This invention provides, in the oxidation of alkanes and cycloalkanes having between 5 and 16 carbon atoms, preferably 5 to 8 carbon atoms, to the corresponding alcohols and ketones, the improvement that comprises carrying out the oxidation continuously and continuously extracting the alochols and ketones from the oxidation mixture with solvents immiscible with the hydrocarbon and essentially unreactive under the oxidation reaction conditions.

The hydrocarbons that are oxidized in the process of this invention are the alkanes and the cycloalkanes having between 5 and 16 carbon atoms, preferably 5 to 8 carbon atoms. Such hydrocarbons include paraffins, such as n-pentane, n-hexane, n-heptane, and the methylpentanes, hexane, octane, decane, dodecane, and hexadecane, The cycloalkanes are of particular interest, such as cyclopentane, cyclohexane, cycloheptane, cyclooctane, methylcyclopentane, methylcyclohexane and the dimethyl cyclohexanes. A particularly valuable hydrocarbon is cyclohexane used to produce cyclohexanol and cyclohexanone.

Although the oxidation reaction can be carried out non-catalytically, catalytic oxidation is generally preferred. Catalysts for such oxidation are well known in the art and include salts, such as naphthenates, stearates, linoleates, oleates, of metals having variable valences, e.g., Fe, Co, Ni, Mn, and Cu. It will be understood that the particular catalyst used is not an essential feature of this invention.

Although pure oxygen can be used in the oxidation reaction, it is preferred to use air. Alternatively, a gaseous mixture containing molecular oxygen can be used, such as an admixture of oxygen and an inert gas such as nitrogen, usually but not necessarily at the oxygen concentration found in air. The oxygen feed rate can be between about 200 and about 800 cc./min. per 2 liters of hydrocarbon, preferably 250–500 cc./min. The oxygen feed rate, and thus rate of oxidation, is related to feed rate of extractant. The faster the extraction rate, the higher the oxygen feed rate, and vice versa.

The oxidation reaction is carried out at temperatures of between about 125° C. and about 180° C., but preferably between about 140° C. and about 160° C. The pressure must be sufficient to maintain liquid phase at reaction temperatures and will be between about 80 p.s.i.g. and about 600 p.s.i.g., preferably between about 125 p.s.i.g. and about 160 p.s.i.g.

It is a salient feature of the process of this invention that the oxidation products are continuously extracted from the oxidation mixture in the oxidation reaction zone and under the oxidation reaction conditions. Such solvents must be immiscible with the hydrocarbon medium and be essentially unreactive under the oxidation reaction conditions. Preferred solvents are the 1,2-glycols, ethylene glycol and propylene glycol (1,2-propandiol) preferably propylene glycol containing 1–15 volume percent water or ethylene glycol. Other utilizable solvents, which are not necessarily equivalent in selectivity for extracting alcohol and ketone products include formamide, dimethyl sulfoxide, furfuryl alcohol, triethanolamine, and any of them combined with 1–15 volume percent water. The rate of extraction is 10–50 cc./minute per 2 liters of reactor volume. The preferred rate is 30 cc./min. per 2 liters.

In the following examples, the manipulative process of this invention is illustrated by the oxidation of cyclohexane to cyclohexanol and cyclohexanone. It will be readily appreciated that this process is readily applicable to other oxidation processes, as described hereinbefore.

EXAMPLE 1

Into a stirred, stainless steel pressure vessel were charged 1560 g. of cyclohexane and 50 p.p.m. of a heavy metal salt, e.g., cobalt naphthenate. Air at 2.5 l./min. was bubbled through the reaction mixture and the pressure and temperature were maintained at 150 p.s.i. and 150° C., respectively. After the induction period, 5–15 minutes, a steady state of 6.5% conversion of the original cyclohexane charged per hour was maintained. Make-up cyclohexane was added during the reaction at such a rate as to maintain a constant level. Ethylene glycol at rates between 10–50 cc./min. was added to the top of the reactor and removed from the bottom of the reactor by the use of a dip tube. The glycol layers were collected and the products were recovered from the ethylene glycol by vacuum distillation and the stripped glycol recycled.

EXAMPLE 2

A series of runs, as described in Example 1, were made except that the extraction solvent was propylene glycol containing 1–15 volume percent water, charged at a rate of 10–60 cc./min. Oxidation products were recovered by vacuum distillation and propylene glycol was recycled to the reactor. Propylene glycol and water had an added advantage in that ketal formation, by reaction of cyclohexanone and propylene glycol was avoided.

EXAMPLES 3 AND 4

The runs described in Examples 1 and 2 were repeated using a mixture of nitrogen and air adjusted to contain 10% $O_2$, by volume, and affffording a steady state rate of 3.25% conversion/hr.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In the process of oxidizing a hydrocarbon selected from the group consisting of alkanes and cycloalkanes having between 5 and 16 carbon atoms to the corresponding alcohols and ketones, in a reaction vessel, at 125–180° C. and at 80–600 p.s.i.g., the improvement that comprises carrying out said process continuously and continuously extracting the alcohols and ketones from the oxidation mixture in situ, in said reaction vessel with solvents immiscible with the hydrocarbon selected from the group consisting of ethylene glycol, propylene glycol, and propylene glycol containing 1–15 volume percent water or ethylene glycol.

2. The process set forth in claim 1, wherein said hydrocarbon is a cycloalkane having between 5 and 8 carbon atoms.

3. The process of claim 2, wherein said hydrocarbon is cyclohexane and said solvent is ethylene glycol.

4. The process of claim 2, wherein said hydrocarbon is cyclohexane and said solvent is propylene glycol containing between one and 15 volume percent water.

References Cited

UNITED STATES PATENTS

| | | | |
|---|---|---|---|
| 2,410,642 | 11/1946 | Farkas et al. | 260—586 |
| 2,974,174 | 3/1961 | Edmiston | 260—586 |

BERNARD HELFIN, *Acting Primary Examiner.*

LEON ZITVER, *Examiner.*

MATTHEW M. JACOB, *Assistant Examiner.*

UNITED STATES PATENT OFFICE
CERTIFICATE OF CORRECTION

Patent No. 3,391,190　　　　　　　　　　　　　　　July 2, 1968

John R. Kilsheimer et al.

It is certified that error appears in the above identified patent and that said Letters Patent are hereby corrected as shown below:

Column 1, line 18, "1-16" should read -- 1-15 --.
Column 3, line 13, "affffording" should read -- affording --.

Signed and sealed this 18th day of November 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents